United States Patent Office 3,328,733
Patented June 27, 1967

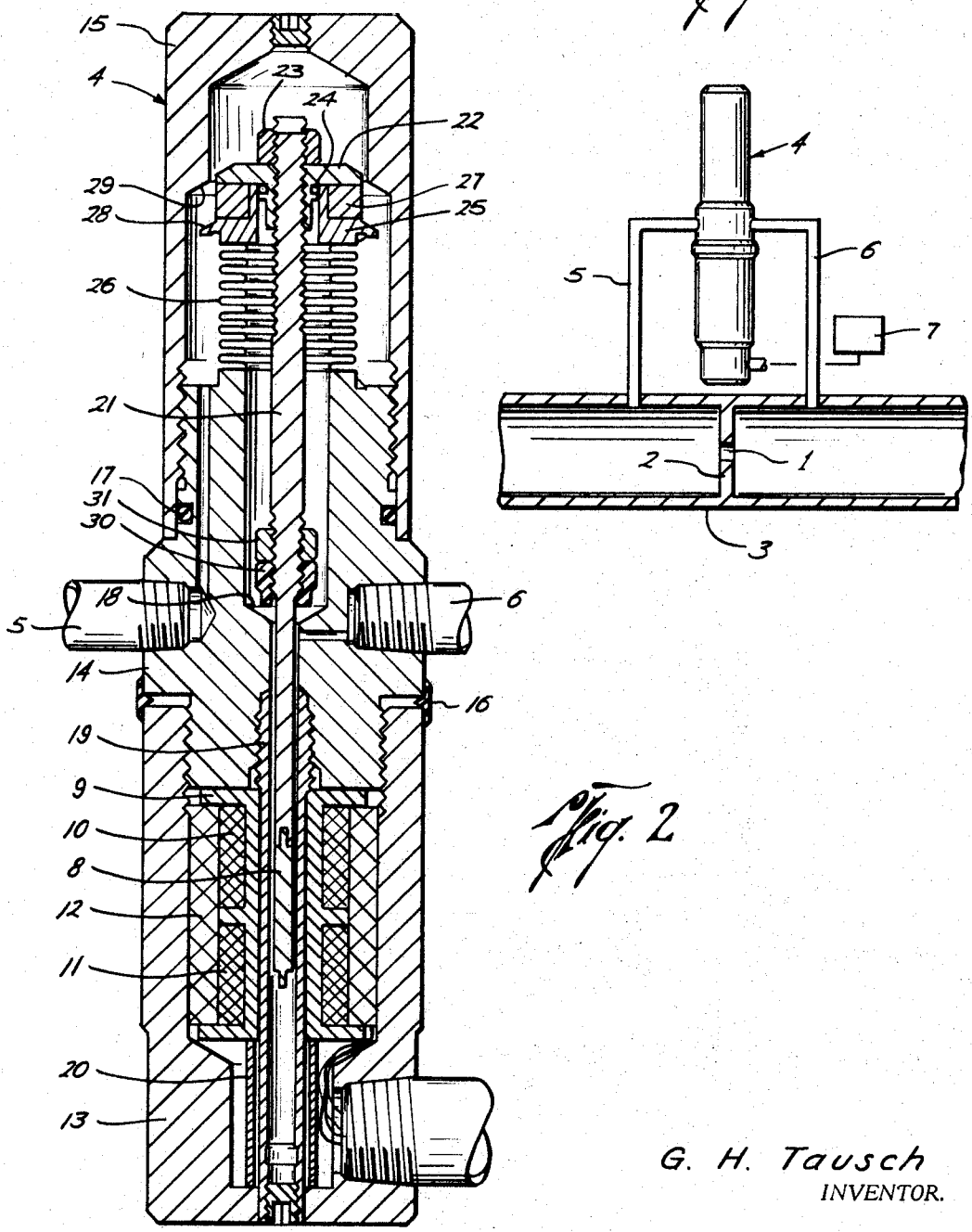

3,328,733
DIFFERENTIAL PRESSURE TRANSDUCER HAVING BELLOWS WITH RELIEF VALVE
Gilbert H. Tausch, Houston, Tex., assignor to Camco, Incorporated, Houston, Tex., a corporation of Texas
Filed June 1, 1965, Ser. No. 460,400
8 Claims. (Cl. 336—30)

This invention relates to fluid flow measuring equipment in which an electro-mechanical transducer responds to fluid pressure differential upstream and downstream of an orifice within a flow pipe and produces voltage in proportion to the pressure differentials.

It is an object of the invention to control a differential transformer by pressure-responsive mechanism of simplified design making use of standard bellows of desirably thin wall spring metal as a chamber partition and with provision for automatically opening valved communication between opposite sides of the bellows partition whenever an imbalance of opposing pressures rise beyond a given range, whereby the likelihood of rapid flutter with violent flexure strain is minimized and more especially the bellows and its associated parts are freed from imposition of destructive stress from excessively high pressure differentials.

Another object of the invention is to provide a chamber partitioning bellows wall with a relief valve in which a closed valve and its seat are normally urged toward seating engagement by magnetic force whose bias yields suddenly to the presence of given differential in pressures on opposite sides of the chamber partitioning wall.

A further object is to provide a bellows valve with a motion-transmitting stem connection with the transformer armature and which stem has a stop abutment engageable with a chamber abutment to limit the extent of armature and valve travel under excessively high upstream pressure and simultaneously to close the downstream passage into the bellows chamber while the bellows valve seat is away from the valve whereby to preclude fluid flow through the transducer device and in bypass relation to the fluid flow path through the metered orifice within the pipe line.

Reference will be made to the accompanying drawing illustrating a preferred embodiment of the invention and wherein:

FIG. 1 is a somewhat diagrammatic view showing a system installation with parts in section, and FIG. 2 is an enlarged vertical sectional of the improved transducer assembly.

As seen in FIG. 1, the direction of fluid flow is from left to right through an orifice 1 of predetermined size through a transverse plate 2 contained within a pipe line 3 so that the differential in pressures upstream and downstream of the metered orifice varies with the flow of fluid and is utilized for obtaining continuous measurement of flow. Fluid pressures on both sides of and immediately adjacent the orifice plate 2 are communicated into a chambered housing 4 having a flexible partition wall and to one side of the divider partition through a pipe connection 5 with the upstream and normally higher pressured side of the orifice and to the opposite side of the partition through a pipe connection 6 with the downstream side of the orifice. Displacement of the partition as influenced by differences in opposing fluid pressures thereon is transmitted to a moving element of a differential transformer for producing voltage proportional to the displacement from either side of its electric center. Such voltage controls an instrument 7 which provides a continuing flow measurement record.

The differential transformer mentioned includes an armature or ferrite rod core 8 shiftable axially within a spool 9 to either side of null position with reference, as shown in FIG. 2, to a pair of axially spaced apart secondary coils 10 and 11 wound on the spool 9 and surrounded by a primary coil 12. Off-center displacement of the armature 8 provides higher or lower voltage in the respective secondary coils dependent on the relative lengths of the armature within each coil.

The transformer coil and spool assembly is housed within the hollow body 4 conveniently made up of a lower cup 13, a medial tubular member 14 and an upper cup 15 threaded together in end to end succession. An elastic band 16 bridges adjoining ends of the medial body 14 and the end cup 13 as a seal to minimize leakage through the connecting threads. An O-ring 17 is provided for sealing at the connecting threads of the body 14 and end cup 15. The central bore in the tubular body member 14 is stepped in diameter to provide an upwardly facing internal shoulder 18 and the bore is extended downwardly through a dependent tube 19, projecting through the bottom of the lower cup member 13. This extension tube 19 receives the armature coil 8 and is surrounded by and centers the coil spool 9 whose opposite ends are clamped against the bottom of the medial body 14 and a spacer sleeve 20 resting on the base of the coil enclosing bottom cup 13.

Transformer armature position is controlled by connection with the lower end of a motion-transmitting valve stem 21 extending through the shouldered bore of the tubular body member 14 to an adjustable screw threaded attachment with a valve head 22 of magnetic material. A lock nut 23 on the stem engages the head 22 for maintaining an adjustment setting by which the armature 8 is initially positioned in its null location when actuating pressures within the transducer are in balance. The adjustable screw threads are preferably coated with a suitable sealing compound to resist leakage along the threads.

Fitted within an annular groove of a dependent neck on the head 22 is an O-ring 24 which has slide seal bearing on the interior cylindrical wall of a centrally apertured ring 25 of nonmagnetic material, preferably stainless steel, which is secured to and constitutes a part of the upper free end of a spring metal bellows 26 of relatively thin wall stock. At its opposite end, the resilient bellows wall 26 is secured and sealed to the top of the medial body member 14. As illustrated, the centrally aperture ring 25 is of smaller outside diameter in its upper region where a surrounding permanent magnet 27 is fitted as a unit with the ring. The upper surface of the magnet and the upper edge face of the ring 25 are preferably coplanar for seating engagement with the under surface of the nonmagnetic valve head 22, and these surfaces normally remain seated on one another and maintain the passageway between the interior and the exterior of the resilient wall assembly in closed condition under the bias of the magnetic attraction of the magnet 27 when the head 22, as an armature, is within the field of the magnet. Below the magnet a peripheral rib 28 projects outwardly in normally spaced relation to a downwardly facing abutment shoulder 29 within the cup 19. Engagement of the shoulder 29 by the rib 28 limits the range of bellows distention.

The hollow cup 15 in cooperation with the central bore through the medial body member 14 affords an internal chamber which is partitioned by the bellows and its top closure valve. The enclosed chamber internally of the partition communicates below the shoulder 18 with a threaded port for connection with the lower pressure pipe 6. Pipe line pressure downstream of the orifice 1 is present within the bellows 26 and tends to distend the bellows as well as to raise the transformer armature 8. Externally of the bellows the chamber communicates with a threaded port for connection with the higher pressure pipe connection 5. Pipe line pressure upstream of the orifice 1 is present exteriorly of the bellows and tends to depress the bellows and also the transformer armature 8. In the absence of pressure differentials within the transducer chamber and in excess of a predetermined range, the valve seat surfaces between the free end of the bellows and the valve head remain in engagement and their unison travel in response to the pressure differences is transmitted to the transformer core 8.

Should upstream pressure in the pipe line increase in relation to downstream pressure to an extent beyond a predetermined safety range and which excess could do harm to the equipment, provision is here made to limit and stop downward travel of the valve stem 21 and head 22, whereupon continued bellows retraction breaks apart the sealing surfaces at the top of the bellows for opening its central aperture to the passage of pressure fluid into the bellows and for effecting pressure equalization on opposite faces of the bellows. Such action is obtained by adjustably mounting, as by screw threads, a stop abutment member for engagement with the shoulder 18 in the bore of the body member 14. Preferably, such stop consists of the bottom edge of a sleeve 30 formed of suitable material such as polytetrafluoroethylene backed by a nut 31. When the sleeve 30 seats against the shoulder 18, it acts as a valve to close chamber communication with the downstream side of the orifice 1, so that pipe line fluid cannot flow through the transducer in bypass relation to the orifice.

If for any reason downstream pressure so greatly exceeds pressure upstream of the orifice as to present danger of stress injury, the pressure differential will favor raising the valve head 22 from its seat. Such separation of the seating surfaces may occur whether or not the peripheral rib 28 at the top of the bellows is in abutment with its limit stop shoulder 29. Whenever the valved passageway through the partition is open, pressure differentials lessen for saving the parts from undue strain.

The field strength of the magnet 29 is predetermined in relation to pressure differential in excess of a given range so that the seating surfaces remain tightly closed until desirable unseating is called for. Once the seating surfaces crack open, they will tend to pop further apart quickly with snap action inasmuch as magnetic force decreases in the gap and at an increasing higher rate as gap size widens. Such decreasing magnetic attraction in the direction to pull the valve head 22 toward the top of the bellows, offsets the increasing spring rate as the bellows is depressed. The result is a sure breakaway of the seating surfaces and an instantly wide opening for pressure relief toward the low pressure side of the partition. Similarly, when gap size decreases in the valve closing direction, the magnetic force increases as the seating surfaces are pulled together and the final clearance is quickly closed.

The action of the magnet in constant attraction of its armature or head 22 permits use of a face type seal and eliminates dependence on the relatively light weight of the valve head and stem in maintenance of O-ring compression. A face type seal also permits pressure equalization with only slight travel of the bellows top and the stem head away from one another. Should an excessive pressure become dominant on the normally low pressure internal side of the partition wall, the valve head and stem may blow away from the bellows seat, but as pressure equalization proceeds, the pull of the magnet helps to return the stem head and reseat the partition passage closure surfaces.

When the size of the metered orifice 1 has been properly selected for known pipe line fluid flow conditions then excessively wide pressure differentials should be infrequent. Generally, the higher upstream pressure is present within the transducer chamber on the outside of the bellows and the top of the valve member whereby the transformer armature 8 shifts downwardly from its null position to the extent that the valve head 22 moves down with spring bellows contraction in response to differences in upstream and downstream pressures and instant changes of pressure differential. Excessive upstream pressure may depress the chamber partition until the abutment sleeve 30 on the stem contacts the stop shoulder 18 whereupon travel of the stem and valve stops. On further compression of the spring bellows, the valve seating surfaces of the partition separate for reducing pressure imbalance on opposite sides of the chamber partition. When the sleeve 30 is seated against the shoulder 18, continuous fluid flow from the transducer will be sealed off and minimize the cause of rapid oscillation and fatigue of bellows wall convolutions. Upon reduction of excessive pressures, the bellows again lengthens into contact with the valve head and then raises the valve stem to break the seal at the sleeve 30 and the assembly once more is in condition for functioning as a differential pressure transducer.

Only a preferred embodiment of the invention has been described, but it is to be understood that various modifications in the detail structure are within the scope of the invention as set forth in the appended claims.

What is claimed is:

1. In an electro-mechanical transducer having a differential transformer constituted by relatively movable armature and coil members, the improvement comprising
    a chambered body fixedly mounted relative to one of the members,
    a pair of pressure fluid inlet connections communicating with spaced apart regions of the chamber within the body,
    chamber partitioning means separating the chamber regions and having movable connection with the other member and responsive in movement to differential fluid pressures on opposite sides thereof, said partitioning means including
        a resilient wall having one portion secured to the body and another portion formed as an annular valve seating surface, a motion-transmitting stem providing the connection with said other member and terminating in a head exposed to fluid pressures on opposite sides thereof and provided with a valve seating surface movable toward and from seating engagement with the first-mentioned valve seating surface, and
    a magnet fixed in the partitioning means relative to one of the valve seating surfaces and arranged to attract the two seating surfaces toward seating engagement while accommodating their separation under predetermined fluid pressure differentials.

2. In an electro-mechanical transducer as in claim 1, together with a pair of cooperating seating surfaces, one on the body and the other on said stem in normally spaced apart relation and adapted upon stem movement in one direction to seat on one another as both a limit stop to head movement and a closure against communication between the chamber and one of the pressure fluid inlet connections.

3. In an electro-mechanical transducer, differential transformer coil means, an armature shiftable within the coil means, a chambered body fixed relative to the coil means and provided with a pair of spaced apart pressure fluid inlets communicating with the chamber within the body, a spring metal bellows positioned within the chamber between said pressure fluid inlets and secured at one end to the body, a valve seat and a magnet at the other end of the bellows, and a valve element of magnetic material biased under force of the magnet toward closing contact with the valve seat for cooperation with the bellows in providing a chamber partition wall between said inlets, said valve element having motion-transmitting connection with said armature and being movable as a unit with said valve seat in response to imbalance of opposing fluid pressure forces active on opposite sides of the partition wall and within a given range of opposing force differential, the magnet force being of a magnitude to be overcome by fluid pressure differential in excess of a given range and to accommodate separation of the valve element and the valve seat.

4. In an electro-mechanical transducer as in claim 3, wherein said motion-transmitting connection includes adjustable means by which the armature can be positioned in selective relation with the transformer coil means and with the position of the valve element when opposing fluid pressure forces on the valve element are in balance.

5. In an electro-mechanical transducer having an armature shiftable within differential transformer coil means, a chambered body having spaced apart pressure fluid inlets, means for fixedly locating the coil means relative to the body, a flexible partition wall positioned within the chamber of the body between said inlets and provided with an annular valve seat surrounding an opening through the wall, a valve member movable in response to differential pressures on opposite sides thereof into and out of engagement with said valve seat on one side of the wall and provided with a stem projecting therefrom on the other side of the wall into motion-transmitting connection with the armature, an annular valve seat formation surrounding an aperture through which said stem projects and being positioned by the body internally of the chamber between said partition wall and the pressure fluid inlet on said other side of the wall, and valve means carried by the stem and engageable with said valve seat formation to close communication between the chamber and the last mentioned inlet upon a given extent of travel of said valve member in the direction of its movement toward its seat.

6. In an electro-mechanical transducer as in claim 5, together with means to adjust the relative positions of said valve means and said valve seat formation for selective control of said extent of travel.

7. In an electro-mechanical transducer as in claim 5, wherein the valve means is carried by the stem through an adjustable connection whose adjustment controls said given extent of travel.

8. In a pressure-actuated device, a body enclosing a chamber and having a pair of pressure fluid inlets to the chamber, a movable partition within the chamber between said inlets, responsive to differential pressure on opposite sides of the partition, said partition comprising a resilient wall having a normally closed passage therethrough, an annular member on the wall in surrounding relation to the passage and provided with a valve seat surface, a valve member having a seat surface engageable with the seat surface on the annular member for closing said passage, said seat surfaces being movable away from one another upon relative movement of the members in response to pressure differential on opposite sides of the partition, one of said members including a magnet and the other member including magnetic material positioned in the field of the magnet for attraction thereto in opposition to separation of the seating surfaces.

No references cited.

LEWIS H. MYERS, *Primary Examiner.*

H. W. COLLINS, *Assistant Examiner.*